(12) United States Patent  
Kravtsov

(10) Patent No.: US 6,727,772 B2  
(45) Date of Patent: Apr. 27, 2004

(54) METHOD AND SYSTEM FOR SYNCHRONIZING A QUADRATURE AMPLITUDE MODULATION DEMODULATOR

(75) Inventor: Vladimir Kravtsov, Jerusalem (IL)

(73) Assignee: Intel Corporation, CA (US)

( * ) Notice: Subject to any disclaimer, the term of this patent is extended or adjusted under 35 U.S.C. 154(b) by 34 days.

(21) Appl. No.: 10/135,836

(22) Filed: May 1, 2002

(65) Prior Publication Data

US 2003/0206073 A1 Nov. 6, 2003

(51) Int. Cl.[7] .................................................. H03C 3/00
(52) U.S. Cl. .................... 332/103; 329/307; 375/261; 375/264; 375/287
(58) Field of Search ................... 332/102–104, 332/105, 150; 329/304–308; 375/232, 235, 261, 264, 286, 287

(56) References Cited

U.S. PATENT DOCUMENTS

| | | | | | |
|---|---|---|---|---|---|
| 5,544,328 | A | * | 8/1996 | Seshadri | 375/261 |
| 5,793,818 | A | * | 8/1998 | Claydon et al. | 375/326 |
| 5,838,734 | A | * | 11/1998 | Wright | 375/316 |
| 6,005,897 | A | * | 12/1999 | McCallister et al. | 375/340 |
| 6,268,767 | B1 | * | 7/2001 | Maalej et al. | 329/304 |
| 6,282,168 | B1 | * | 8/2001 | Vijayan et al. | 370/203 |

* cited by examiner

*Primary Examiner*—Timothy P. Callahan  
*Assistant Examiner*—An T. Luu  
(74) *Attorney, Agent, or Firm*—Eitan, Pearl, Latzer, & Cohen Zedek, LLP

(57) ABSTRACT

In some embodiments of the present invention, there is a system and method of synchronizing a QAM demodulator by determining a phase offset error value between an actual phase shift of a received symbol and an estimated phase shift value.

20 Claims, 4 Drawing Sheets

METHOD AND SYSTEM FOR SYNCHRONIZING A QUADRATURE AMPLITUDE MODULATION DEMODULATOR

BACKGROUND OF THE INVENTION

QAM modulators and demodulators are well known and may be used as part of numerous communication applications and links, for example telephone and cable modems. Telephone and cable modems are usually connected to a telephone line or a coaxial cable either through a telephone jack connector or a coaxial connector, respectively. In general, a QAM modulator may convert a set of bits into a symbol which may be represented by a point on a complex plane. Each symbol and its associated point may be identified either by its i and q coordinates (using a rectangular coordinate system) or by its angle and magnitude (using a rotational coordinate system). The set of all points on a complex plane associated with a QAM modulator's full set of symbols may be referred to as a constellation or "known" constellation. FIG. 2A shows a "known" constellation associated with a QAM 25 modulator, having 25 symbols, and thus having 25 points on a complex plane.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
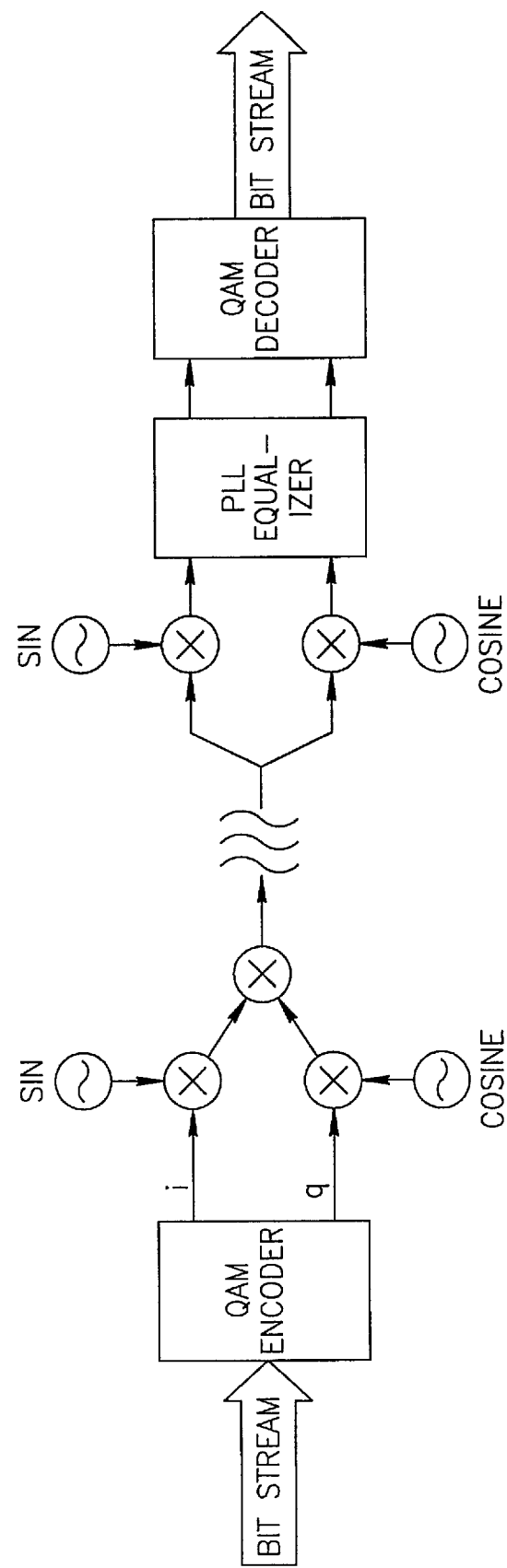
FIG. 1 shows a block diagram of a paired QAM modulator and demodulator.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Turning now to FIG. 1 (left side), there is shown how QAM modulation may be implemented using a QAM encoder (also known as a mapper) and a pair of oscillators, each of which may produce a carrier signal ninety degrees out of phase from the other. Each symbol's i component may be mixed with one of the carrier signals and its q component may be mixed with the other carrier signal. A symbol's i and q components may be extracted from the modulated QAM signal by mixing the QAM signal with carrier signals produced by oscillators in the demodulator which correspond to oscillators in the modulator (see FIG. 1, right side).

Figure 2A:
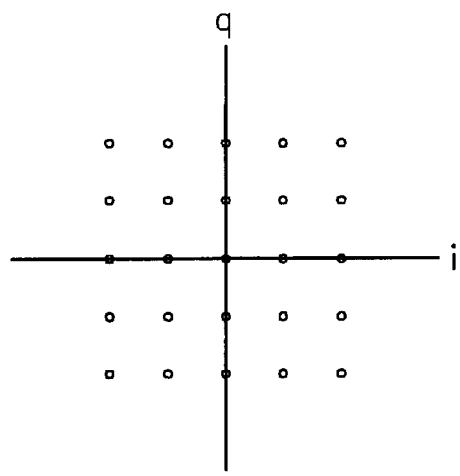
FIG. 2A shows a graph on a complex plane of a known constellation associated with a QAM 25 modulator, helpful in understanding the present invention.
Figure 2B:
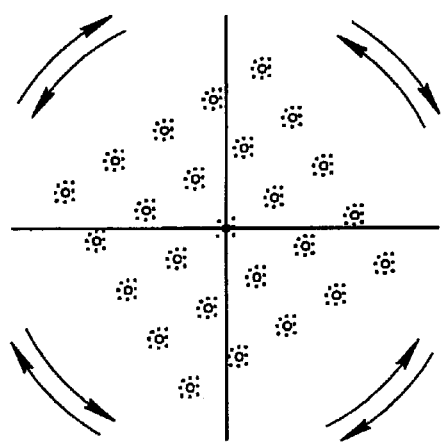
FIG. 2B shows a graph on a complex plane of a set of points associated with symbols received by a QAM 25 demodulator, prior to rotation by an equalizer, helpful in understanding the present invention.

Due to a lack of synchronization between the oscillators used for modulating and those used for demodulating, a phase shift may occur for a given symbol (n) when demodulated. FIG. 2B shows a constellation of received symbols shifted by some phase shift value. The phase shifts may vary from symbol to symbol, and the phase shift variance between consecutive symbols may be referred to as a phase shift step $\Delta\Phi$. That is, the received constellation, as shown in FIG. 2B, may rotate at a rate of $\Delta\Phi$ per symbol.

Figure 2C:
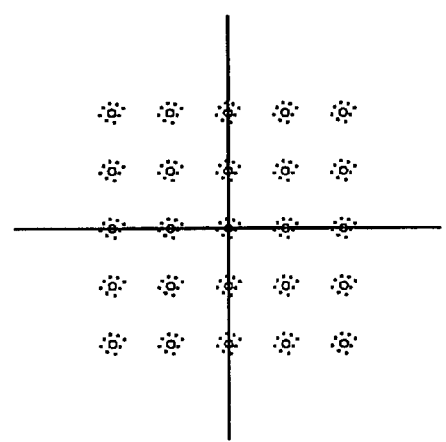
FIG. 2C shows a graph on a complex plane of a set of points associated with symbols received by a QAM 25 demodulator, after rotation by an equalizer, helpful in understanding the present invention.
Figure 3:
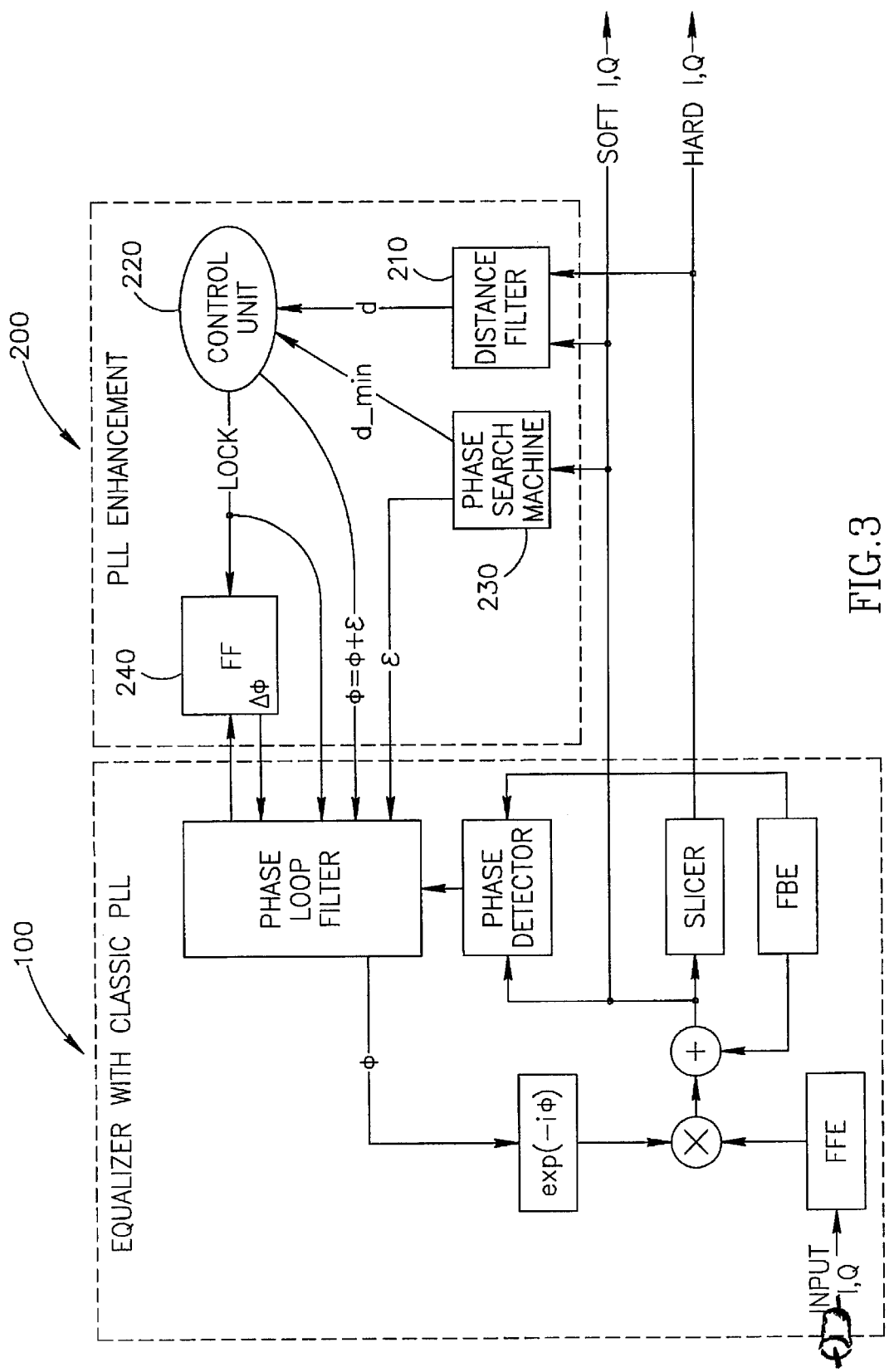
FIG. 3 is a block diagram of an exemplary equalizer and a synchronization system according to some embodiments of the present invention.

A phase lock loop ("PLL") equalizer, an example of which is shown on the left side of FIG. 3, may be used to compensate for phase shifts during a QAM demodulator's operation. Typical implementations of an equalizer rotate back a received symbol (n) by an estimated phase shift $\Phi_n$, thus trying to compensate for the symbol's actual phase shift. FIG. 2C shows the appearance of a set of symbols received and equalized. Demodulation and equalization may produce a received constellation which, instead of having a distinct point representing each given symbol, has a cloud of points centered around that symbol's corresponding point in the known constellation.

PLL equalization may be implemented, for example, by first adjusting and/or rotating a received symbol's coordinates. Often there is a calculation of rotation angle $\Phi_n$, where $\Phi_n$ is a function of the last estimated phase shift value $\Phi_{n-1}$, plus an estimated phase shift step value $\Delta\Phi$. The estimated phase shift step value $\Delta\Phi$ is an estimated change in phase shift between the coordinates of consecutively received symbols. The adjusted coordinates of the received symbol (adjusted by rotating the received symbol coordinates by an estimated phase shift value), may be referred to as soft decision values, and may be compared against all points in the known QAM constellation. The closest constellation point to the received symbol adjusted coordinates, soft decision values, may be referred to as the hard decision. Both $\Phi$ and $\Delta\Phi$ may be adjusted or updated such that a running average of the offset between the received and adjusted coordinates and their corresponding coordinates from the known constellation is near or at zero.

When the coordinates of a received symbol are improperly rotated or adjusted, for example, because the PLL equalizer has not yet calculated proper values for $\Phi$ and $\Delta\Phi$, or because an error was caused by noise on the communications channel between the modulator and demodulator, a decoding error may occur. Since $\Phi$ and $\Delta\Phi$ may be updated according to information resulting from a false decode, the error may propagate for the attempted decoding of many subsequently received symbols. The received constellation, even after adjustment, may appear to rotate out of control until the PLL equalizer fixes on proper values for $\Phi$ and $\Delta\Phi$, at which point the received constellation may stabilize. This method of synchronization, allowing the received and adjusted constellation to rotate until proper value for $\Phi$ and $\Delta\Phi$ are found, may require many cycles.

Turning now to FIG. 3, there is shown an exemplary equalizer 100 along with a synchronization unit 200 according to some embodiments of the present invention. As part of these embodiments, the synchronization unit 200 may, for example, contain a distance filter 210 coupled to the output of the equalizer 100. The distance filter 210 may receive soft and hard decisions for each received symbol from the equalizer 100.

A soft decision for a symbol (n) may be defined, for example, as the coordinates of the received symbol once the coordinates have been adjusted or rotated by an estimated phase shift value $\Phi_n$. A hard decision may be defined, for example, as the coordinates of a point on the QAM's known constellation nearest to the received symbol's adjusted or rotated coordinates.

The distance filter 210 may, for example, calculate a distance value between equalized coordinates of a received symbol and the coordinates of the received symbol's closest match in the QAM's known constellation. A distance value may be calculated using any suitable distance formula, for example:

$$d = \sqrt{(i_{hard} - i_{soft})^2 + (q_{hard} - q_{soft})^2}$$

The distance filter 210 may calculate a running average value of the distance values. The running average value may be obtained using an infinite impulse response filter ("IIR"), a finite response filter ("FIR"), or any other suitable averaging methodology or technique. If the average distance value calculated by the distance filter 210 exceeds a threshold value, the distance filter 210 may signal a control unit 220 that the equalizer's estimated phase shift value $\Phi_n$, by which coordinates of received symbols are being adjusted or rotated, is not sufficiently accurate. Possibly because the equalizer 100 has not had a chance to calculate proper values for $\Phi$ and $\Delta\Phi$, or possibly because of a noise burst on the channel between the demodulator, an average distance value calculated by the distance filter 210 above a threshold value may indicate to the controller 220 that decode errors are occurring.

While averaged distance d is low, current values of $\Delta\Phi$ may be filtered by a low-pass filter, until such time that it is detemined that an error has occurred and $\Delta\Phi$ is no longer accurate. At that point, the average value for $\Delta\Phi$ may be kept fixed, until such time as an end to the burst error is detected, and proper values for $\Delta\Phi$ may be determined.

Upon receiving a signal from the distance filter 210 indicating that the average distance value is above a predefined threshold, the control unit 220 may signal a phase search machine 230 to begin searching for a phase offset error value $\epsilon$. A phase offset error value may be defined as the phase difference between the actual phase shift of a received symbol's coordinates and the estimated phase shift value $\Phi_n$ by which the equalizer 100 is rotating the coordinates of the received symbol.

Upon receiving a signal from the distance filter 210 indicating that the average distance value is above a predefined threshold, the control unit 220 may also signal the equalizer 100 to stop updating the estimated phase shift step value $\Delta\Phi$. Frequency filter 240 may monitor and maintain a running average of past and present values for the estimated phase shift step $\Delta\Phi$, and may maintain a record of the last valid value for the estimated phase shift step value $\Delta\Phi$ prior to the distance filter indicating that an average distance value is above the predefined threshold value.

Figures 4, 5:
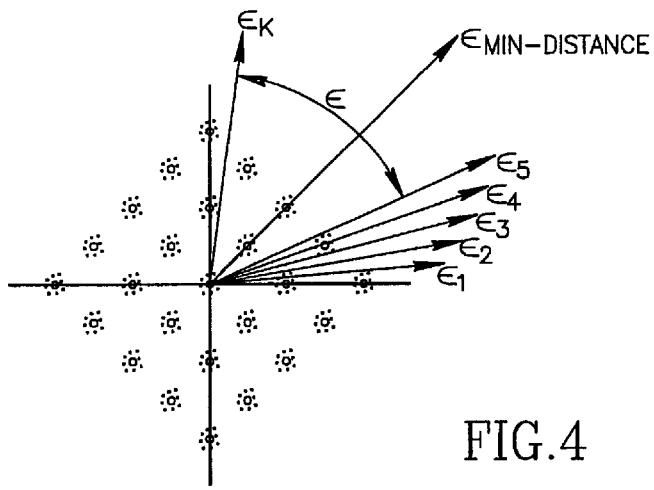
FIG. 4 is a graph on a complex plane showing possible offset angles for which the phase search machine of FIG. 3 may calculate symbol distance values.
FIG. 5 is a table showing the order of tabulation of distance values calculated by the phase search machine of FIG. 3.

As part of searching for an accurate phase offset error value $\epsilon_{PHASE\_OFFSET\_ERROR}$, the phase search machine 230 may generate a set of possible phase offset error values. Turning now to FIG. 4, there is shown a set of possible phase offset error values $\epsilon_0$ to $\epsilon_k$, where so may be equal to 0 Radians, $\epsilon_k$ may be equal to $\pi/2$ Radians, and $\epsilon_n = \epsilon_0 + \pi/126n$. Also shown in FIG. 4 is a set of points representing a set of received symbols whose phase may be shifted by some unknown phase.

The phase search machine 230 may adjust or rotate the soft decision values of a received symbol n by each of the possible phase offset error values $\epsilon_0$ to $\epsilon_k$, and for each offset value may calculate the distance between the rotated soft decision values and the coordinates of the nearest point on the known constellation. For each received symbol, at each possible phase offset error value $\epsilon_0$ to $\epsilon_k$, a set of distance values may be calculated, and then the set may be averaged, where each distance value per symbol is associated with a possible offset error value within the range of $\epsilon_0$ to $\epsilon_k$.

The phase search machine 230 may calculate a set of distance values for each consecutively received symbol and then maintain a running average of the values. FIG. 5 shows a table exemplifying how a set of distance values may be organized or tabulated for each of a series of received symbols. Each time a new symbol is received, the phase search machine 230 may calculate a new set of distances, one distance value for each of the possible phase offset error values, $\epsilon_0$ to $\epsilon_k$. For each possible offset value $\epsilon_n$, the phase search machine 230 may calculate a running average of distance values over a set of consecutive symbols. That is, for each value of $\epsilon_n$ (represented by a column in FIG. 5), the phase search machine 230 may calculate the average distance value over a sampling of consecutive symbols. Averaging may be performed using an IIR or a FIR filter, or any other averaging technique. A running average using a suitable sample size (e.g. 5 to 100 symbols) may be used.

Each time a new symbol is received, a new set of average distance values may be calculated for each possible phase offset error value $\epsilon_n$, as shown on the right side of FIG. 5. If for a given possible offset error value $\epsilon$ the average distance value $[d_\epsilon]$ is lower than the other average distance values associated with other possible phase offset error values, that given possible phase offset error value may be selected as the correct or actual phase offset error value. The possible offset error value a whose average distance value $[d_\epsilon]$ is lower than the other average distance values may also be lower than some predefined threshold average distance value, such that the difference between the lowest distance value $[d_\epsilon]$ and the next lowest value is statistically significant.

As an illustration, the row in the table of FIG. 5 associated with $\epsilon_n$ is designated as having the lowest average distance value $[d_\epsilon]$ which is also lower than some threshold value $d_{THRESHOLD}$. Therefore, according to the example of FIG. 5, $\epsilon_n$ may be selected as the correct or actual phase offset error value.

Turning back to FIG. 3, there is shown that the equalizer 100 may be provided with the actual phase offset error value 6, such that the estimated phase shift value $\Phi_n$ is update to equal $\Phi_n = \Phi + \epsilon_n$. Furthermore, the equalizer 100 may receive an estimated phase step value $\Delta\Phi$ stored by the frequency filter 240.

An average distance value for a given $\epsilon$ being lower than the average distance values for all other possible phase offset error values by some statistically significant value may indicate that any burst noise which may have caused the phase search engine 230 to be activated has dissipated and/or stopped. Once burst noise has ceased, the actual phase offset error value calculated, and the estimated phase shift and phase shift step values updated, the equalizer 100 may operate normally until the next event which causes it to lose synchronization.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of synchronizing a Quadrature Amplitude Modulation demodulator, the method comprising:

determining a phase offset error value between an actual phase shift of a received symbol and an estimated phase shift value when an average distance value between coordinates of a received symbol which have been rotated by the estimated phase shift and coordinates of a point in a known constellation exceeds a threshold value.

2. The method of claim 1, further comprising:

adjusting the estimated phase shift value by the phase offset error value.

3. The method of claim 1, wherein determining the phase offset error value comprises:

further rotating by a possible offset error value a received symbol's coordinates which have already been adjusted by an estimated phase shift value; and calculating a distance value between the further rotated and adjusted coordinates and coordinates of a point in a known constellation, wherein the point in the known constellation has the shortest distance to the further rotated and adjusted coordinates.

4. The method of claim 3, wherein determining the phase offset error value further comprises:

further rotating by each of a set of possible offset error values a received symbol's coordinates which have already been adjusted by the estimated phase shift value; and calculating a set of distance values, wherein each distance value is related to each of the further rotated coordinates and a nearest point in the known constellation.

5. The method of claim 4, wherein determining the phase offset error value further comprises:

calculating a set of distance values for further rotated coordinates of a second received symbol whose coordinates have been adjusted by the estimated phase shift value.

6. The method of claim 5, wherein determining the phase offset error value further comprises averaging over multiple symbols the distance value correlated to each possible offset error value.

7. The method of claim 6, wherein determining the phase offset error value further comprises:

selecting as the phase offset error value a possible offset error value correlated to an average distance value lower than other average distance values.

8. The method of claim 7, wherein determining the phase offset error value further comprises:

selecting as the phase offset error value a possible offset error value correlated to the lowest average distance value.

9. The method of claim 5, wherein determining the phase offset error value further comprises:

selecting as the phase offset error value a possible offset error value correlated to an average distance value lower than any other average distance value by at least some predetermined value.

10. A system for synchronizing a Quadrature Amplitude Modulation demodulator comprising:

a phase search machine to determine a phase offset error value between an actual phase shift of a received symbol and an estimated phase shift value when an average distance value between coordinates of a received symbol which have been rotated by the estimated phase shift and coordinates of a point in a known constellation exceeds a threshold value.

11. The system of claim 10 further comprising:

a distance filter to calculate a distance between coordinates of the received symbol which have been adjusted by a the estimated phase shift value and a point in a known constellation nearest to the adjusted coordinates.

12. The system of claim 11, wherein said distance filter sends a signal to a control unit indicating that a burst error has occurred when said distance filter calculates the distance to be above a threshold distance value.

13. The system of claim 12, wherein said control unit activates said phase search machine upon receiving the signal from said distance filter.

14. The system of claim 13, further comprising:

a phase loop filter, wherein said control unit upon receiving the signal from said distance filter signals said phase loop filter to stop updating an estimated phase shift value.

15. The system of claim 13, further comprising:

a phase loop filter, wherein said control unit upon receiving the signal from said distance filter signals said phase loop filter to stop updating an estimated phase shift step value.

16. The system of claim 15, further comprising:

a frequency filter to receive and average estimated phase shift step values from said phase loop filter.

17. The system of claim 16, wherein said phase search machine updates said phase loop filter with the phase offset error value.

18. The system of claim 17, wherein said phase loop filter receives an average estimated phase shift step value from said frequency filter.

19. A system for synchronizing a Quadrature Amplitude Modulation demodulator comprising:

a phase search machine to determine a phase offset error value between an actual phase shift of a received symbol and an estimated phase shift value when an average distance value between coordinates of a received symbol which have been rotated by the estimated phase shift and coordinates of a point in a known constellation exceeds a threshold value; and a coaxial connector to receive a symbol over some communication medium.

20. The system according to claim 19, wherein the communication medium is a coaxial cable with a coaxial jack corresponding to said coaxial connector.

* * * * *